United States Patent [19]

Kalokhe

[11] 4,428,704
[45] Jan. 31, 1984

[54] MICRO-ADJUSTING CARTRIDGE FOR CUTTING TOOL

[75] Inventor: Shivdas Kalokhe, Clinton, Canada

[73] Assignee: Ex-Cell-O Corporation, Troy, Mich.

[21] Appl. No.: 408,306

[22] Filed: Mar. 16, 1982

Related U.S. Application Data

[63] Continuation of Ser. No. 172,731, Jul. 28, 1980, abandoned.

[51] Int. Cl.³ .............................................. B23B 29/00
[52] U.S. Cl. ...................................... 408/156; 407/37;
407/45; 407/76; 407/83; 407/89; 408/181;
408/185
[58] Field of Search ....................................... 407/8–10,
407/86, 87, 37, 45, 46, 89, 90, 74–76, 73, 81, 83,
84; 408/181, 188, 154, 155, 156, 187, 180, 713,
182–185

[56] References Cited

U.S. PATENT DOCUMENTS

| | | | |
|---|---|---|---|
| 1,400,642 | 12/1921 | Van der Vorn | 408/183 |
| 1,659,370 | 9/1923 | Magln | 408/183 |
| 2,266,339 | 12/1941 | Shutz | 408/181 |
| 2,753,617 | 7/1956 | Felenchak | 407/10 |
| 3,190,152 | 6/1965 | Werth | 408/16 |
| 3,282,133 | 11/1966 | Dickinson et al. | 408/156 |
| 3,427,904 | 2/1969 | Arendt | 407/9 |
| 3,486,401 | 12/1969 | Kelm | 408/181 |
| 3,635,572 | 1/1972 | Robinson | 408/181 |
| 3,755,868 | 9/1973 | La Forge et al. | 407/75 |
| 3,941,497 | 3/1976 | Ballini | 408/181 |

Primary Examiner—Leonidas Vlachos
Assistant Examiner—Jerry Kearns
Attorney, Agent, or Firm—Edward J. Timmer

[57] ABSTRACT

A tool cartridge to be fastened to a boring bar for line boring operations comprising a pair of split legs on the tool cartridge. Each leg has an insert with a threaded bore having a different pitch. A differential screw comprising two threads on the shaft corresponding to the two different threaded bores on each insert effects a micro-adjustment of the radially moveable leg on the cartridge holding the cutting tool when the differential screw is rotated.

2 Claims, 6 Drawing Figures

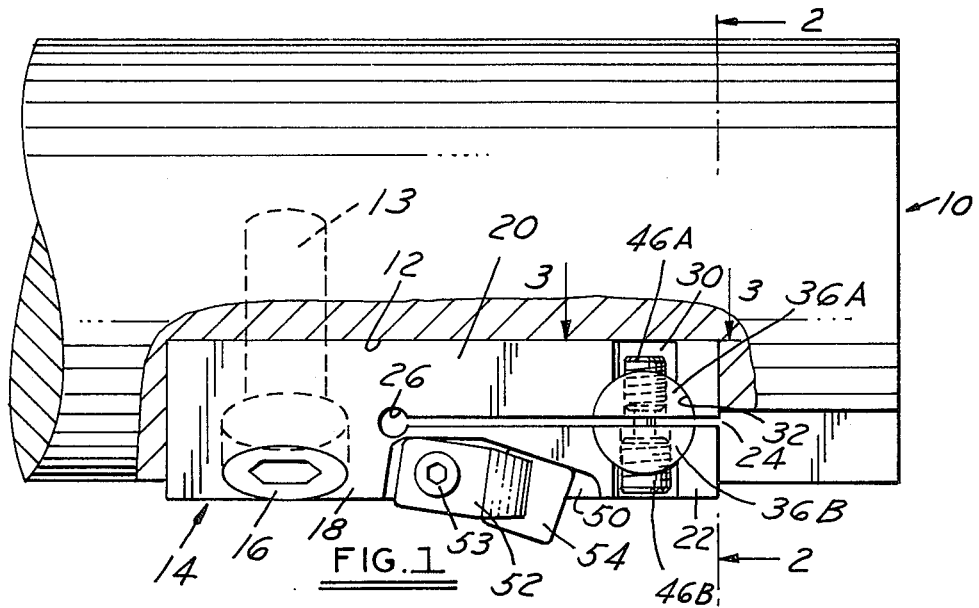
FIG. 1
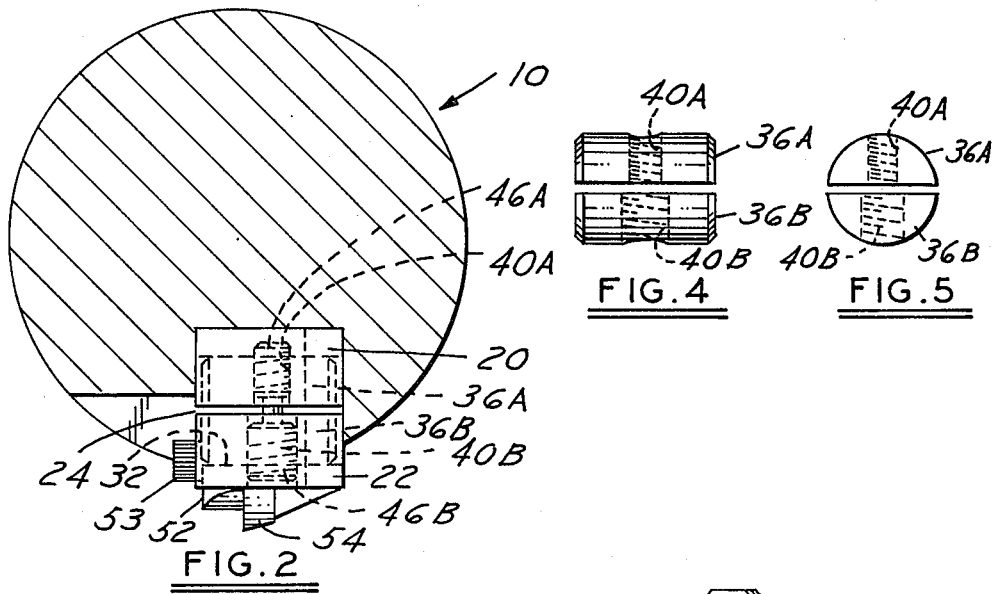
FIG. 2
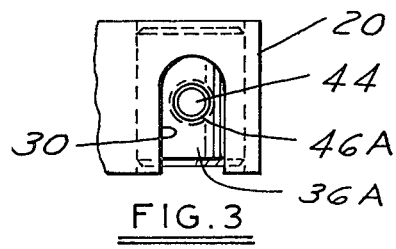
FIG. 3
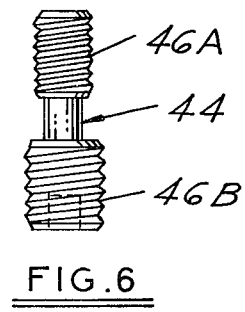
FIG. 4
FIG. 5
FIG. 6

MICRO-ADJUSTING CARTRIDGE FOR CUTTING TOOL

This is a continuation of application Ser. No. 172,731, filed July 28, 1980 now abandoned.

BACKGROUND OF THE INVENTION

The present invention relates to a metal cutting tool, and more particularly, to a boring tool having a microadjusting means for adjusting the cartridge holding the tool.

Previous inventions provide for adjusting the cutting tool such as disclosed in Eversole U.S. Pat. No. 3,801,213, Gulibon U.S. Pat. No. 3,765,788, Keller U.S. Pat. No. 4,105,360, Shutz U.S. Pat. No. 2,266,339 and Samoilov (Russian) No. 460,119. However, the prior art fails to provide for adjusting the cutting tool in small or micrometer increments.

BRIEF SUMMARY OF THE INVENTION

The present invention relates to a boring bar having a radially adjusting cutting tool thereon. The cutting tool is radially adjusted using a cartridge with a split or saw-cut in the center to provide for radial movement of the ends or legs of the cartridge toward or away from each other. A bore interconnecting both legs of the cartridge is provided with threads, however, each leg is tapped with a different thread per inch. A differential screw with threads corresponding to the thread per inch in each leg is tapped and inserted through both legs of the cartridge. As the screw is turned, the two halves or legs of the cartridge tend to move away or close. The movement of the cutting tool mounted on one of the legs of the cartridge is radially adjusted depending upon the difference between the two threads per inch tapped in each leg of the cartridge and corresponding threads on the differential screw.

BRIEF DESCRIPTION OF THE DRAWINGS

FIG. 1 shows part of a boring bar with the cartridge in place, and the radially adjustable cutting tool secured thereto;

FIG. 2 shows a cross-section of the boring bar and the cartridge, taken along line 2—2 of FIG. 1;

FIG. 3 is a view taken along line 3—3 of FIG. 1;

FIG. 4 is a plan view of the bronze or steel insert;

FIG. 5 is the end view of the bronze or steel insert;

FIG. 6 is a plan view of the differential screw showing different threads per inch thereon.

DESCRIPTION OF THE INVENTION

With reference to FIG. 1 and FIG. 2, the portion of the boring bar 10 shows a recess 12 and a threaded bore 13 which provides the cartridge 14 to be fastened or secured thereto by a bolt 16. The cartridge 14 has a bight portion 18 and two legs 20 and 22 separated by a recess 24. The recess 24 terminates in a bore 26 to provide resilient movement of the legs 20 and 22 of cartridge 14. Interconnecting the two legs 20 and 22 is a recess 30. A bore 32 is reamed perpendicular to recess 30 to accommodate bronze or steel inserts 36A and 36B (shown in FIG. 4 and FIG. 5). In operation the subassembly bronze or steel insert comprise semi-circular halves 36A and 36B which are dropped in the reamed bore 32 of the cartridge 14. The bore 40A in bronze or steel insert 36A is threaded to a pitch that is different than the pitch in threaded bore 40B. For example, the preferred embodiment shows that the threaded bore 40A is #6-40, the pitch being 1/40; and the threaded bore 40B is #10-32, the pitch being 1/32. The pitch difference between 1/40 and 1/32 is approximately 0.006 thousands of an inch (0.031-0.025). The pitch is defined as the distance, measured parallel to its axis, between corresponding points on adjacent threads in the same axial plane.

A differential screw, shown in FIG. 6, incorporates two different tapped threads 46A and 46B in the same direction. That is, both tapped threads are either right hand or left hand threads. In the preferred embodiment, one thread is tapped #6-40 and the other thread is tapped #10-32. The difference between the two different pitches provides the motion or radial movement; for example, 40 threads per inch provides a motion of 1/40 or 0.025 thousands of an inch, and 32 threads per inch provides a motion of 1/32 or 0.031 thousands of an inch. The two pitch dimensions are subtracted providing a difference of 0.006 thousands, the difference through which the two semi-halves bronze or steel inserts 36A and 36B start separating or coming together as the differential screw is being rotated or turned.

Thus, according to the preferred embodiment, the differential screw is inserted through the bores of inserts 36A and 36B with the threads both right hand as defined above, and as the differential screw 44 is turned clockwise the bronze or steel inserts 36A and 36B are moved away from each other. However, since leg 20 is relatively fixed in the recess of the boring bar 10, the leg 22 will move radially away from the leg 20 of cartridge 14. The leg 22 comprises a recess 50 with a clamp member 52 secured to the cartridge 14 by a screw 53. The clamp member 52 is adapted to hold a cutting tool 54 to the leg 22 of cartridge 14.

Movement of differential screw 44 in a clockwise direction, with right hand tapped threads 40A and 40B in inserts 36A and 36B corresponding to right hand tapped threads 46A and 46B on shaft 44, causes the leg 22 to move radially effecting the gap or recess 24 of cartridge 14 to widen thus causing cutting tool 54 to move radially outwardly. Moving the tool radially outwardly will cut a larger diameter of the workpiece.

To move the cutting tool 34 radially inward, the differential screw 44 is turned counterclockwise, causing the two semi-circular bronze or steel inserts 36A and 36B to move toward each other, effecting movement of leg 22 toward leg 20.

The bronze or steel pair of bushings or inserts 36A and 36B are made from a single round bar stock and cut through the center to provide two symmetrical halves or inserts. One insert is bored and threaded with pitch different from the threaded bore of the other insert. The differential screw 44 has threads on each end of the shaft corresponding to the threaded bores of the two inserts 36A and 36B.

The invention described hereinabove provides more micro adjustment per revolution. That is, one revolution of a screw provides 0.025 inches, whereas one revolution of a differential screw, as described hereinabove, provides 0.006 inches. Furthermore, the cartridge is cheaper to manufacture and replacement is more economical.

What is claimed is:

1. A boring tool with an adjustable cutting diameter, comprising a boring bar having a long axis and an outwardly facing, open recess extending along the long axis and a tool cartridge mounted in said recess, said cartridge having a bight portion with means for mounting the cartridge in said recess, a pair of legs extending from said bight portion in spaced apart, substantially parallel relation with each other and the long axis in said recess with an inner leg abutted against the boring bar and an outer leg carrying cutting means for cutting engagement with a workpiece and being resiliently movable relative to said inner leg, said legs each having transverse threaded bore means in axial alignment, with the threaded bore means of one leg having different pitch threads from the threaded bore means of the other leg, said cartridge further comprising transverse screw means threadably received in the threaded bore means connecting said legs and having an inner end terminating in said inner leg short of said boring bar so as to be out of contact therewith with the screw means having different pitch threads adjacent opposite ends corresponding with those of the respective threaded bore means such that rotation of said screw means moves said outer leg and cutting means thereon relative to said inner leg to adjust cutting diameter without said screw means having to engage the boring bar for such adjustment.

2. The boring tool of claim 1 wherein each threaded bore means comprises a transverse bore through each leg, an insert-receiving bore in each leg perpendicular to and in communication with said transverse bore, and an insert received in each insert-receiving bore with each insert having a threaded insert bore coaxially aligned with said transverse bore, said threaded insert bores having different pitch threads.

* * * * *